United States Patent
Suur-Askola et al.

[11] Patent Number: 5,712,457
[45] Date of Patent: Jan. 27, 1998

[54] APPARATUS FOR REGULATING AN ELEVATOR MOTOR

[75] Inventors: Seppo Suur-Askola, Riihimäki; Ralf Ekholm, Helsinki, both of Finland

[73] Assignee: Kone Oy, Helsinki, Finland

[21] Appl. No.: 438,554

[22] Filed: May 10, 1995

[30] Foreign Application Priority Data

May 11, 1994 [FI] Finland .................... 942208

[51] Int. Cl.$^6$ .................... B66B 1/28; H02P 5/34
[52] U.S. Cl. .................... 187/296; 318/801; 318/803; 187/293
[58] Field of Search .................... 187/391, 293, 187/296, 290, 289; 318/803, 807, 727, 805, 808, 806, 801, 802, 800, 799

[56] References Cited

U.S. PATENT DOCUMENTS

| | | | |
|---|---|---|---|
| 3,961,688 | 6/1976 | Maynard | 187/29 R |
| 4,678,980 | 7/1987 | Sugimoto et al. | 318/759 |
| 4,788,485 | 11/1988 | Kawagishi et al. | 318/811 |
| 4,926,104 | 5/1990 | King et al. | 318/599 |
| 5,089,760 | 2/1992 | Joyner, Jr. | 318/798 |
| 5,229,558 | 7/1993 | Hakala | 187/118 |
| 5,250,890 | 10/1993 | Tanamachi et al. | 318/811 |
| 5,373,195 | 12/1994 | De Donker et al. | 307/45 |
| 5,495,908 | 3/1996 | Obara et al. | 180/65.8 |
| 5,500,581 | 3/1996 | Hatanaka et al. | 318/727 |

FOREIGN PATENT DOCUMENTS

| | | |
|---|---|---|
| 0426056 | 5/1991 | European Pat. Off. . |
| 86053 | 7/1992 | Finland . |
| 2168829 | 6/1986 | United Kingdom . |

OTHER PUBLICATIONS

"Microprocessor Controlled Transistor Voltage-Source Inverter Asynchronous Motor Drive", T. Frank et al., International Conference on Electrical Machines, vol. 3, Sep. 18-21, 1984, Switzerland, pp. 839-842.

Abstract of Japanese Patent No. 60-43084, Mar. 7, 1985, *Patent Abstracts of Japan*, vol. 9, No. 169, (E-328) [1892] Jul. 13, 1985.

*Primary Examiner*—Robert Nappi

[57] ABSTRACT

The invention relates to an apparatus for regulating the speed of an a.c. elevator motor (10) by means of a frequency converter (8) consisting of a rectifier bridge (12) and an inverter bridge (14) with an intermediate circuit between them. The frequency of the frequency converter is adjusted until it corresponds to a frequency reference ($f_{ref}$) corresponding to the speed reference ($v_{ref}, v_{ref}'$) of the motor. The velocity of the motor ($v_{real}$) is measured to form a speed feedback signal. According to the invention, the apparatus has elements (24,26) for correcting the speed reference ($v_{ref}$) on the basis of the change occurring in the voltage ($U_c$) of the intermediate circuit.

4 Claims, 1 Drawing Sheet ated by the speed reference of the motor. The velocity of the motor is measured to form a speed feedback signal. The apparatus is provided with voltage measuring elements for measuring the voltage of the intermediate circuit.

APPARATUS FOR REGULATING AN ELEVATOR MOTOR

The invention relates to an apparatus for regulating the speed of an a.c. elevator motor, having a frequency converter with a rectifier bridge, an inverter bridge and an intermediate circuit between them. By means of the frequency converter, the frequency of the supply network connected to the rectifier bridge is adjusted to obtain a frequency corresponding to a frequency reference determined by the speed reference of the motor. The velocity of the motor is measured to form a speed feedback signal. The apparatus is provided with voltage measuring elements for measuring the voltage of the intermediate circuit.

The drive motor used in an elevator is often an a.c. motor fed by a frequency converter controlling the frequency of the a.c. voltage feeding the motor. A commonly used frequency converter consists of a rectifier connected to the supply network and via a d.c. intermediate circuit to an inverter producing an a.c. voltage.

The speed of an asynchronous motor is determined by the frequency of the motor supply voltage, and the motor speed is generally adjusted by varying this frequency. The ability of the network and the motor control system to produce a sufficient motor torque depends on the current supply capacity of the network and the stability of the network voltage at a sufficient value. If the network voltage falls, then, above a certain speed limit, the motor will not receive sufficient power to maintain the speed. This problem is encountered in weak networks. In this respect, temporary power supply systems such as construction-time drives involve particularly difficult problems.

A previously known solution in which the hoisting motor of an elevator is driven at a speed below the nominal speed during an undervoltage condition of the supply network is presented in Finnish published specification FI C 86053. In this method, the supply network voltage is measured and when a reduction in the voltage is detected, the value of the motor speed reference is reduced. In this solution, however, the motor speed cannot adapt sufficiently fast to the changing conditions. Major deviations of the load torque from the rated value will result in a situation where the control system is unable to keep pace with the abrupt increase in the power requirement of the motor.

SUMMARY OF THE INVENTION

The object of the invention is to achieve an apparatus which enables an elevator motor to work even when the network voltage varies rapidly and even when the reduction in the voltage is relatively large. To implement this, the invention is characterized in that the apparatus comprises means for correcting the speed reference on the basis of a change in the voltage of the intermediate circuit. Other preferred embodiments of the invention are defined also.

In the solution of the invention, the motor is so regulated that it does not require more power than the network can supply. At the same time, the magnitudes of the torque required by the load and of the torque generated by the motor are monitored and the speed limit is set to a value corresponding to these magnitudes.

The apparatus for reducing the motor speed can be connected to a previously installed frequency converter feeding a motor, which means that it can easily be added to a normal elevator system for the time required by the construction work without any changes in the elevator system itself. Due to the use of a time-delay circuit, the elevator drive does not cause an unnecessary strain on the network in changeable load conditions. This allows a more secure and reliable supply of power to other construction-time working machines such as cranes etc.

In the course of elevator installation work, there often occur unbalance conditions that are not encountered in normal elevator drives. For example, the traction sheave of the elevator may have to sustain the whole mass of the counterweight and handle the resulting excessive torque. With the apparatus of the invention, the speed of rotation of the elevator motor is reduced correspondingly and no excessive strain is placed on the supply network. Ambient conditions, e.g. the temperature, may differ considerably from normal during construction and involve an additional load on the elevator drive. As the invention uses torque control, the effect is not reflected on the supply network.

BRIEF DESCRIPTION OF THE DRAWINGS

In the following, the invention is described in detail by the aid of one of its embodiments by referring to FIG. 1 in the drawing, presenting a circuit for the supply of power to a motor as provided by the invention.

DETAILED DESCRIPTION OF THE PREFERRED EMBODIMENTS

Figure 1:
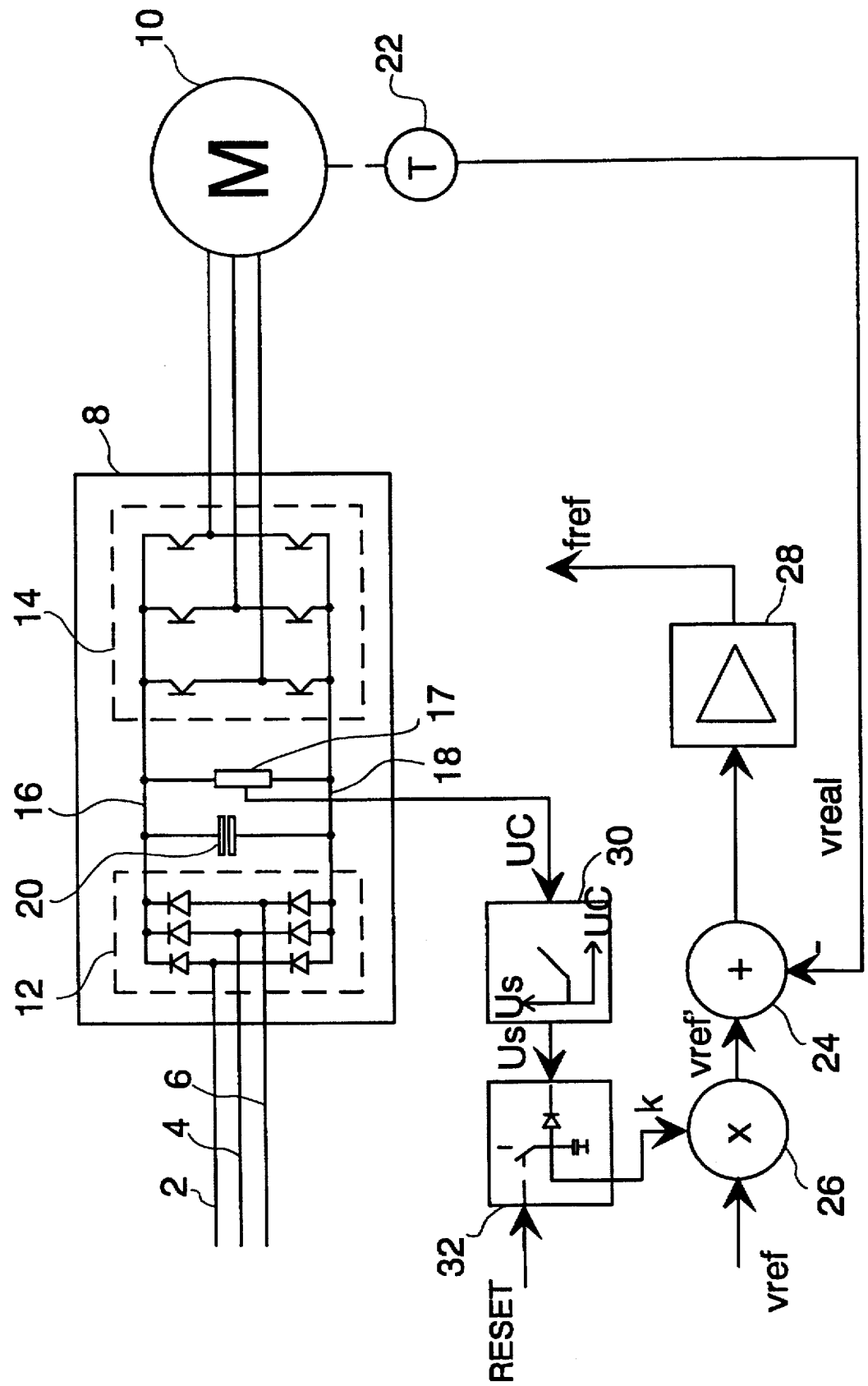

As illustrated by FIG. 1, a three-phase a.c. elevator motor 10 is fed by a frequency converter 8 connected via phase conductors 2, 4 and 6 to an electricity supply network. The frequency converter consists of a diode rectifier 12, a transistor-based inverter bridge 14 and d.c. conductors 16 and 18 between them. Connected between the d.c. conductors is a capacitor 20.

The control of the motor speed is based on a speed reference and speed feedback. The speed of the motor 10 is measured by means of a tachometer 22, whose measurement result $V_{real}$ is passed to a differential element 24. The speed reference $V_{ref}$ is obtained from the control equipment (not shown) of the elevator drive. By means of a multiplier 26, the speed reference is corrected by a factor determined by the voltage in the d.c. circuit of the frequency converter. The corrected speed reference $V_{ref}'$ is passed to the differential element 24, which produces the difference between the values of the speed reference and the real speed. Based on this difference, an amplifier device 28 further produces a frequency reference, which is passed to the inverter bridge 14 of the frequency converter to control the transistors as required by the reference.

The d.c. circuit voltage $U_c$ between conductors 16 and 18 is measured by a measuring circuit 17 and the measurement result is passed to a limiter circuit 30 which produces a scaled measurement value $U_s$. A memory circuit 32 stores the scaled voltage $U_s$ and, based on this voltage, forms a coefficient k by which the speed reference $v_{ref}$ is corrected in the multiplier circuit 26. The memory circuit 32 is provided with a time-delay circuit to ensure that the speed reference correction term will not revert to a higher value during rapid voltage changes.

When the voltage $U_c$ in the d.c. intermediate circuit falls, the corrected speed reference $v_{ref}'$ produced by the multiplier 26 falls, too. $V_{ref}$ is also reduced in comparison with the actual speed $v_{real}$ measured by the tachometer, thus reducing the frequency reference $f_{ref}$ from amplifier 28 and the elevator speed. In practice, the speed reduction can be implemented in a stepwise manner such that when the inverter intermediate circuit voltage falls by 5% from its nominal value, this will cause the maximum speed of the elevator to be reduced from a velocity of 2.5 m/s to a value of 1.6 m/s. Similarly, a 10-% voltage drop reduces the speed to 1.0 m/s and a 15-% voltage drop to 0.6 m/s. Speed curves corresponding to these velocities during acceleration and deceleration are stored beforehand in the memory of the elevator control system. The speed curves are so formed that the motor will not develop a torque exceeding the power supply capacity of the network at any stage during acceleration. Therefore, the speed curve has a lower gradient during the initial acceleration stage. The nominal speed or other higher speed is restored by means of a RESET signal input to the time-delay circuit after the normal voltage has been permanently restored or when the voltage has remained at a higher value for a certain time since the last voltage drop. The invention has been described above by the aid of one of its embodiments. However, the presentation is not to be regarded as constituting a limitation of the scope of patent protection, but the embodiments of the invention may vary within the limits defined by the following claims.

We claim:

1. An apparatus for regulating the speed of an a.c. motor, comprising:

a frequency converter having a rectifier bridge, an inverter bridge, and an intermediate circuit between the rectifier bridge and the inverter bridge, said frequency converter producing a frequency corresponding to a frequency reference;

a motor speed detector for detecting the speed of the a.c. motor and producing a motor speed signal;

a voltage measuring circuit for measuring a voltage of the intermediate circuit;

a frequency reference producing circuit for receiving the motor speed signal and an external speed reference signal, and for producing the frequency reference based upon the motor speed signal and the speed reference signal, said frequency reference producing circuit including a limiter device which, based on the measured voltage produces a coefficient by which the speed reference is multiplied in a multiplier element; and a memory and a time-delay circuit designed to keep the coefficient at a constant value for a preset length of time.

2. An apparatus as defined in claim 1, said apparatus being operative for regulating the speed of an a.c. elevator motor, the external speed reference signal being an elevator motor speed reference signal.

3. An apparatus as defined in claim 1, wherein said frequency converter consists of the rectifier bridge, the inverter bridge, and the intermediate circuit.

4. An apparatus as defined in claim 1, said frequency converter being connected to a plurality of phase conductors and receiving a.c. supply signals from the phase conductors.

* * * * *